United States Patent [19]

Stotesbury et al.

[11] Patent Number: 5,417,007
[45] Date of Patent: May 23, 1995

[54] LINE GUIDE FOR FISHING RODS, HAVING HIGH-STRENGTH MOUNTING MEANS

[75] Inventors: Gregory S. Stotesbury; Ian J. Fettes, both of Costa Mesa, Calif.

[73] Assignee: AFTCO Mfg. Co., Inc., Irvine, Calif.

[21] Appl. No.: 168,468

[22] Filed: Dec. 15, 1993

Related U.S. Application Data

[63] Continuation-in-part of Ser. No. 926,831, Aug. 7, 1992, Pat. No. 5,276,991.

[51] Int. Cl.6 .............................................. A01K 87/04
[52] U.S. Cl. ...................................................... 43/24
[58] Field of Search ................................................ 43/24

[56] References Cited

U.S. PATENT DOCUMENTS

| | | | |
|---|---|---|---|
| 1,142,796 | 6/1915 | Brugman . | |
| 2,324,353 | 7/1943 | Berry | 43/24 |
| 2,573,647 | 10/1951 | Marke | 43/24 |
| 2,878,608 | 3/1959 | O'Brien, Jr. | 43/24 |
| 3,091,201 | 5/1963 | Gourley, Jr. | 113/116 |
| 3,165,856 | 1/1965 | Gourley, Jr. | 43/24 |
| 3,315,400 | 4/1967 | Axelson | 43/24 |
| 3,769,736 | 11/1973 | Nydam | 43/24 |
| 3,797,158 | 3/1974 | Immenroth et al. | 43/24 |
| 4,011,680 | 3/1977 | Rienzo, Sr. | 43/24 |
| 4,428,141 | 1/1984 | Kovalovsky | 43/24 |

OTHER PUBLICATIONS

Mildrum Manufacturing Company, Catalog sheet entitled "Stand Up! With the New Mildrum RollerFlex".
AFTCO Mfg. Co., Inc., Catalog sheet entitled "AFTCO Light-Weight Roller Guides".
AFTCO Mfg. Co., Inc., Catalog sheet entitled "New Lightweight Nylatron All-Purpose Roller Guides".

*Primary Examiner*—Mark Rosenbaum
*Assistant Examiner*—Chuck Y. Mah
*Attorney, Agent, or Firm*—Richard L. Gausewitz

[57] ABSTRACT

A line guide-fishing rod blank combination, having a fin or rib that defines pockets into which epoxy wicks to thereby increase greatly the strength of the guide-blank connection.

11 Claims, 2 Drawing Sheets

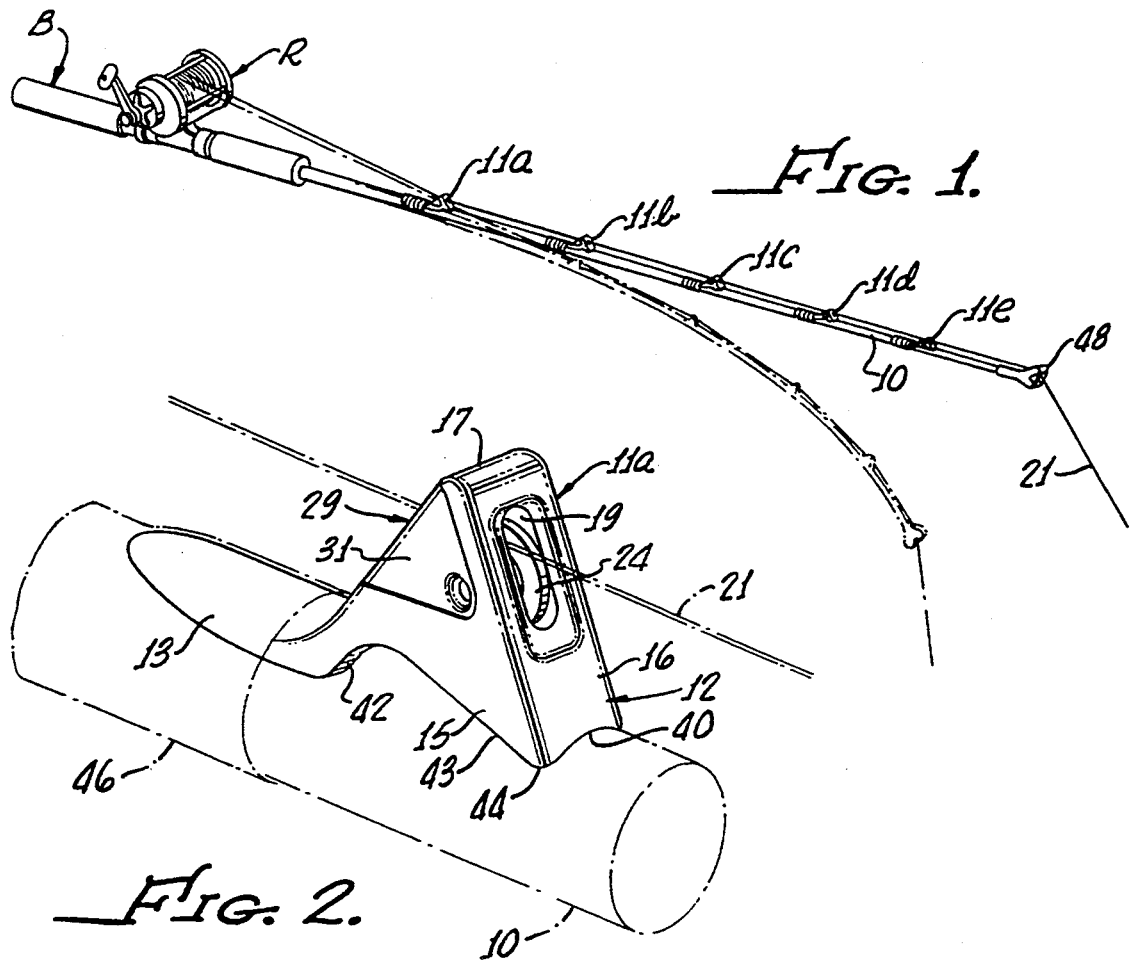
Fig. 1.
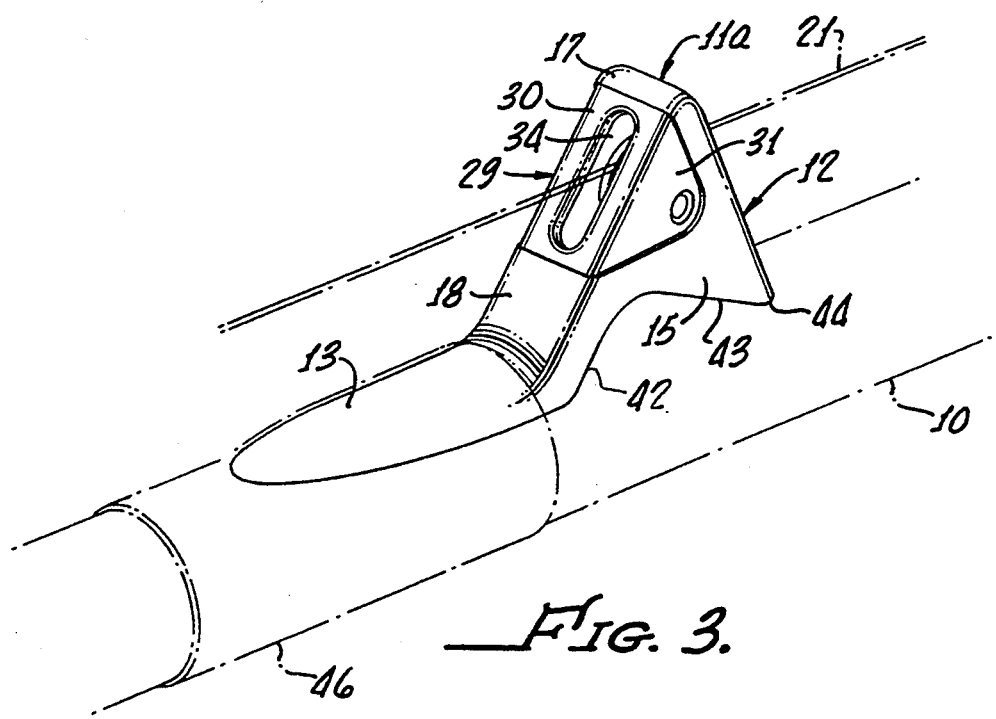
Fig. 2.
Fig. 3.

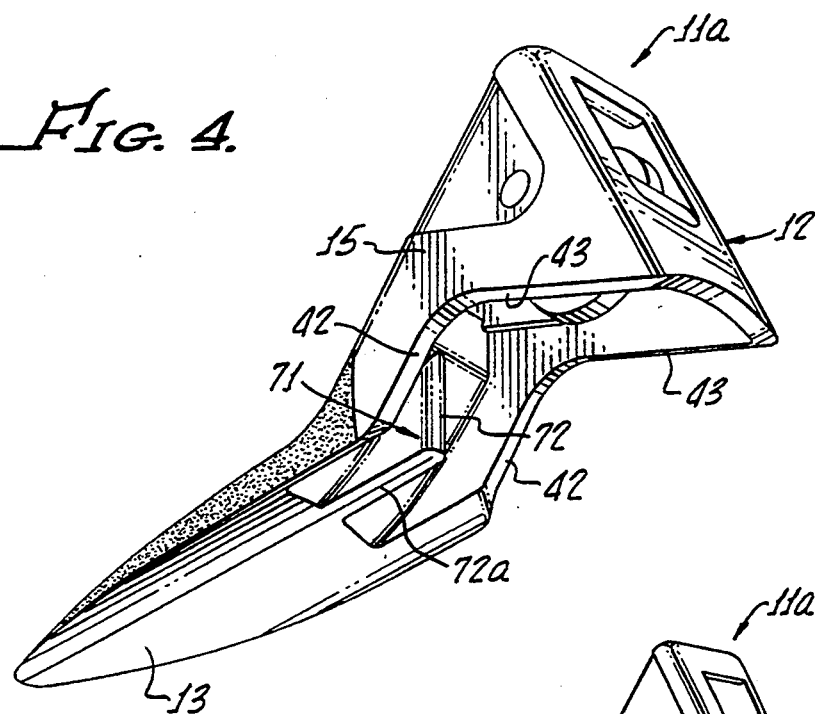
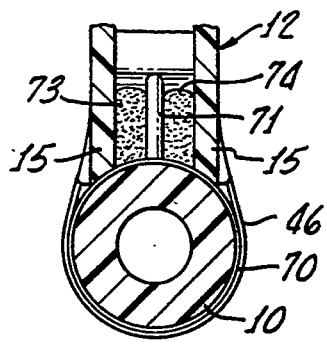
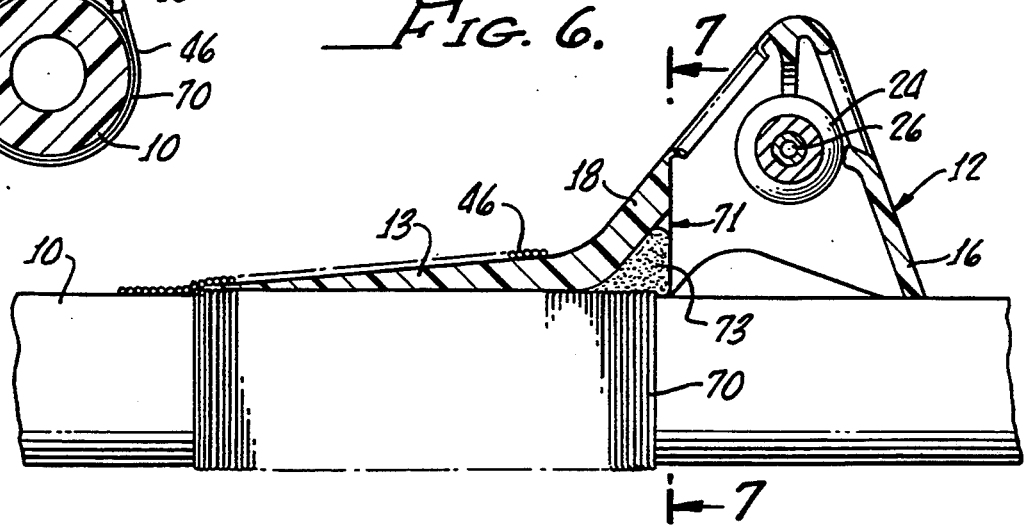

LINE GUIDE FOR FISHING RODS, HAVING HIGH-STRENGTH MOUNTING MEANS

CROSS-REFERENCE TO RELATED APPLICATION

This application is a continuation-in-part of U.S. patent application Ser. No. 07/926,831, filed Aug. 7, 1992, entitled "Lightweight Roller Guide and Tip for Fishing Rods", now U.S. Pat. No. 5,276,991.

BACKGROUND OF THE INVENTION

Especially with lightweight and highly flexible fishing rod blanks, it is very important that the line guides be strongly secured to the blanks but without creating a substantial tendency to reduce the smooth curvature or "action" of the blanks. To state one example, an absurd relationship would be to have a very lightweight and flexible blank that is rigidly secured to the bases of long (for example, four inches) and rigid line guides. The line guides would then act as "splints" to interfere badly with the action of the rod.

Accordingly, a very short (longitudinally of the blank) connection is highly desirable. However, this short connection must create much strength in order to ensure that the line guide does not break off. It is pointed out that substantial torque is generated during playing of a relatively large fish, which torque tends to break the guide off the blank.

SUMMARY OF THE INVENTION

In accordance with one aspect of the present invention, a protuberance is combined with the frame of a line guide near a foot thereof, and is so constructed and located that, when epoxy (or other synthetic resin) is introduced around the protuberance and in contact with the blank, a surprisingly large increase in the strength of the guide-blank attachment is achieved.

In accordance with another aspect of the present invention, the frame of a line guide has a hollow underside, and in such underside is interposed a fin or rib, in such relationship that there are gaps on both sides of the fin or rib and which are adapted to receive epoxy. The epoxy in these gaps and in contact with the underlying blank greatly increases the strength of the guide-blank connection.

In accordance with another aspect of the present invention, the above-stated line guide is a roller guide having an extremely lightweight synthetic resin molded frame with only a single foot that is bound to the rod blank. The foot is located adjacent the frame but not under it, and is bound to the blank over a relatively short distance so as not to tend to stiffen a significant region of the blank.

In accordance with another aspect, the frame recited in the preceding paragraph also has a support region spaced from the single foot and which is not bound to the blank.

BRIEF DESCRIPTION OF THE DRAWINGS

FIG. 1 shows a fishing rod incorporating a preferred form of several guides;

FIGS. 2 and 3 are enlarged isometric views showing a preferred form of the line guide nearest the butt in FIG. 1;

FIG. 4 is an isometric view of said preferred form of line guide, as viewed from beneath so as to show the protuberance, fin or rib;

FIG. 5 is an isometric view illustrating the application of epoxy to the spaces on both sides of the rib shown in FIG. 4, the epoxy also wicking beneath the foot so as to fill the space between the foot and the blank;

FIG. 6 is a longitudinal sectional view of a fully mounted line guide on the blank, the blank being shown in side elevation; and FIG. 7 is a transverse sectional view on line 7—7 of FIG. 6.

DETAILED DESCRIPTION OF THE PREFERRED EMBODIMENT

U.S. patent application Ser. No. 07/926,831, filed Aug. 7, 1992, for "Lightweight Roller Guide and Tip For Fishing Rods" is hereby incorporated by reference herein. Present FIGS. 1-3 are substantially identical to FIGS. 1-3 of said application.

It is to be understood that, in the preferred form of the invention, a set of roller guides is mounted fixedly onto an elongate tapered flexible blank (shaft) 10 that is typically formed of graphite, fiberglass, etc. The preferred blanks 10 of lightweight rods that are employed with fish lines having test weights in the range of, preferably, two pounds to thirty pounds, are highly flexible especially in their regions relatively remote from the butt B and reel R. Typically, there are six or more guides for each blank. For simplicity, there are here shown only five, these being generally denoted 11a, 11b, 11c, 11d and 11e.

Each roller guide has an extremely lightweight hollow frame 12 that is molded integrally of synthetic resin and that is integral with a single foot 13. The entire guide, including frame 12 and foot 13, is symmetrical (a mirror image) about a central imaginary plane that extends vertically through the axis of blank 10.

Frame 10 has parallel sidewalls 15 that are connected integrally to each other by a front wall 16, a top wall 17, and a rear wall 18. Front wall 16 has an opening 19 therein at the upper portion thereof and which is sufficiently large that—because of combination element 29 described below—the fish line 21 will not engage any part of front wall 16 except under unusual circumstances.

Rear wall 18 has an opening therein and which is preferably much larger than front opening 19. However, much of the rear opening is covered by the combination element 29 described subsequently.

The foot 13 of each roller guide has its center line in the above-indicated vertical plane, and extends away from frame 12 toward the butt B of the rod. Each foot 13 is elongate longitudinally of blank 10, the degree of elongation being determined by the size of the particular roller guide. Thus, for example, guide 11a has a relatively long (and wide) foot in comparison to the other illustrated guides, while guide 11e has a relatively short (and narrow) foot. However, foot 13 of even guide 11a is short, such as about an inch. It is also to be noted that guide 11a is on the least flexible part of the blank. All the guides are identical except for size.

The bottom of each hollow frame 12 is open, and the underside of each foot 13 is longitudinally grooved so as to receive in relatively snug-fitting relationship a portion of blank 10. Because frame 12 is hollow, and has an open bottom, there is an "open-bottomed cavity" defined on the underside of the frame.

The frame 12, and its associated foot 13 integral therewith, is molded integrally of (preferably) an acetyl copolymer to which has been added glass fill, polytetrafluoroethylene, and graphite.

Each roller guide 11a, 11b, 11c, 11d and 11e has a roller 24 that is usually identical to the roller of each other guide, including identity of size.

On each of the roller guides 11a, 11b, 11c, 11d and 11e, there is mounted an identical (preferably including identity of size) combination element 29 that serves as the line guard and also as the means for maintaining (retaining) the bearing 26 and thus roller 24 in position (FIGS. 2 and 6). Stated more specifically, element 29 is a U-shaped resilient clip, preferably formed of titanium sheet metal, and having a base 30 and identical sides 31. Preferably, base 30 lies in a single plane, and sides 31 extend perpendicularly to such plane. The combination line guard and bearing retainer 29 is resilient in that its sides 31 may be sprung a short distance apart following which they will spring back towards each other.

The base 30 of each combination line guard and bearing retainer 29 has a vertically-elongate opening 34 therein, having rounded ends, and that is adapted to receive the fish line.

There will next be described how the roller guides are mounted onto blank 10 in a very strong manner yet one which does not significantly diminish the high flexibility of the blank 10, and one which does not tend to effect breakage of any foot or twisting of any frame.

Referring to FIGS. 2-4, it is pointed out that the single foot 13 has a longitudinal axis that extends generally parallel to blank 10 and which, if extended, would pass below bearing 26 (FIG. 6) for the roller. The lower portion of the frame 12 also extends longitudinally of the blank 10 and in only a single direction from the foot 13. After foot 13 as bound to the blank as described subsequently, there are numerous conditions of operation when frame 12 is cantilevered from the bound foot 13—not being supported on blank 10 by any other foot.

Referring to FIG. 2, there is a radiused or curved edge 40 of frame 12 at the lower-front thereof, spaced from foot 13 and adapted at its center to rest on blank 10. When the blank is not flexed, the preferred relationship is one where the curved edge 40 rests on the upper side of the blank. When the blank is flexed downwardly as by a fish on line 21, the blank tends to flex away from curved edge 40. Curved edge 40 extends to corners at sidewalls 15, one corner being shown at 44.

Proceeding next to a description of the foot 13 and the lower regions of frame 12, it is pointed out that the foot tapers divergently toward the frame 12 and, furthermore, that the foot wraps somewhat around the upper portion of the blank. Thus, as above indicated, there is a longitudinal groove in the underside of each foot of different-size guides. Each such groove is adapted to receive the upper side of blank 10 at the appropriate region of the blank. For the small roller guide having a foot adapted to seat on blank 10 relatively near the tip, the amount of wrapping of the foot around the blank is quite large. On the other hand, for the roller guide adapted to seat on blank 10 relatively near the butt, there is much less wrapping of the foot around the blank.

The region of each foot 13 relatively adjacent frame 12 is relatively thick and strong. The region of frame 12 adjacent the foot is strong yet lightweight, being a downwardly-open channel construction having the sidewalls 15.

In various instances a bottom winding or layer 70 (FIG. 7) is wrapped around blank 10. This can better adapt the curvature of the concave underside of each foot 13 to the convex upper side of blank 10, depending upon the particular blank size, the particular one of the guides that is being employed, etc. The wrapping or layer 70 is substantially as long as the foot, and is saturated with epoxy resin after application. Thus, the wrapping strongly adheres to the blank.

The upper surface of each foot 13 is caused to be rough, by roughening the foot portion of the mold in which the frame 12 and foot 13 are molded, thus minimizing the tendency toward sliding of binding line on the foot surface.

To assemble a roller guide 11a, etc., to blank 10, foot 13 is wrapped or bound onto the blank 10 as by (for example) A or B-size nylon thread. Thereafter, epoxy (finish) liquid is applied to the threads and to adjacent regions, and allowed to cure so as to complete the mounting operation. The impregnated wrap thread is shown at 46 in FIG. 6 and elsewhere.

There is caused to be a small pool of liquid finish (epoxy resin) at the foot end of frame 12. On the other hand, the construction of the frame is caused to be such that epoxy does not flow up into the roller 24 or its bearing. One of numerous shapes for preventing such upward flow of epoxy is shown (for example) at the bottom of the frame, each illustrated lower edge bending upwardly at 42 at a relatively steep angle, and inclining gently downwardly at 43 to the corners or points 44.

An internal wide protuberance or "bump" is molded integrally on the underside of frame wall 18 adjacent foot 13. This is to further prevent epoxy from moving excessively away from the foot, and (much more importantly) to provide a strong region of adhesively strongly connected epoxy and frame material.

The above-indicated bump or protuberance is now a fin or rib or anchor 71 (FIGS. 4, 6 and 7) that is molded integrally with rear wall 18 of frame 12. The fin 71 has parallel sidewalls that are generally parallel to, and spaced equal distances from, the sidewalls 15 of the frame 12. It has a vertical forward edge 72 and a generally horizontal bottom edge 72a, as best shown in FIG. 4. It has substantial size, extending forwardly to beneath the rear portion of the opening in wall 18.

The sidewalls of fin 71 are spaced away from the interior surfaces of frame sidewalls 15 by a distance that is sufficiently large to admit a substantial quantity of epoxy resin but sufficiently small that wicking can occur. Thus, there are strong resin portions or masses 73 and 74 such as are shown in FIGS. 6 and 7, such portions being between the fin and the respective sidewalls 15. The resin masses 73,74, fill large amounts of the spaces between fin and sidewalls.

Resin also flows (wicks) rearwardly to the region below foot 13 and above the wrapping 70, where such a wrapping 70 is present. When no such wrapping 70 is present, the resin flows to substantially the entire space between blank and foot-contacting and bonding directly to the blank instead of contacting and bonding to the wrapping 70.

The combination of the strong masses 73,74 of resin (FIGS. 6 and 7), and the fin 71 sandwiched between them, and the frame sidewalls 15 on the outside of them, together with bond between the bottom regions of such masses and the adjacent upper surface portion of blank 10 or the epoxy-affixed inner wrapping 70 thereon, and together with the bond between the undersurface of foot 13 and the upper surface of the blank or the epoxy-secured wrapping 70 thereon, create a joint that is surprisingly strong and that has proved to be very rugged and effective in service. Although each guide has only one foot that is secured to the blank 10, in the preferred embodiment, the described bonding and components ensure that the line supporting and guiding means (preferably including a roller) is strongly secured to blank 10.

Epoxy or other suitable synthetic bonding resin (finish) is preferably applied by a brush (FIG. 5) that is first dipped in resin and then moved repeatedly in a rearward direction so as to push epoxy between fin 71 and the walls 15 opposite thereto. Thus, the epoxy not only fills the indicated spaces on both sides of the fin, but it is pushed rearwardly so that it will wick back under the foot.

The result is guides having much lateral stability and strength, in spite of the fact that in the preferred embodiment there is only one foot.

The fin operates as an "anchor", to trap the rod finish or resin, create the indicated masses 73,74 of finish or resin, and maximize the strength of the joint.

The spaces on both sides of the fin may be termed pockets that have open-bottom portions at the blank (whether or not the blank is wrapped). Epoxy in such pockets bonds to the blank. There are at least two "epoxy-receiving pockets".

The foregoing detailed description is to be clearly understood as given by way of illustration and example only, the spirit and scope of this invention being limited solely by the appended claims.

What is claimed is:

1. A line guide for fishing rods, comprising:
    (a) guide means to guide and laterally loosely confine a fishing line, and
    (b) connector means to support said guide means and connect the same to a rod blank,
        said connector means comprising foot means,
        said connector means further comprising means to define at least two epoxy-receiving pockets,
            the shapes and locations of said pockets being such that when said foot means is seated on a rod blank, said pockets have open portions at which epoxy introduced into said pockets contacts and adheres to said blank as said epoxy also adheres to walls of said pockets.

2. The invention as claimed in claim 1, in which said guide means is roller guide means.

3. The invention as claimed in claim 1, in which said foot means comprises a foot adapted to be secured to a fishing rod blank by being bound thereto as well as by epoxy, said foot being adjacent said pockets.

4. The invention as claimed in claim 3, in which said foot means is only a single foot adapted to be bound to a blank.

5. A line guide for fishing rods, comprising:
    (a) guide means to guide and laterally loosely confine a fishing line, and
    (b) a synthetic resin frame for said guide means, and
    (c) a synthetic resin foot connected to said frame and having an underside generally shaped to seat on a cylindrical upper surface portion of a rod blank,
        said frame having an open-bottomed cavity defined on the underside thereof relatively near said foot and adapted to contain resin, and
    (d) a fin fixedly connected to said frame and located in said cavity at a region of substantial adjacency between said foot and said frame, and dividing said cavity into open-bottomed regions defined between said fin and opposite portions of said frame, said open-bottomed regions being adapted to contain epoxy that contacts a fishing rod blank at said regions.

6. The invention as claimed in claim 5, in which said foot extends longitudinally of said blank and has a portion on the underside thereof that is in communication with said regions, whereby epoxy is wicked from said regions to the space on the underside of said foot.

7. The invention as claimed in claim 5, in which said frame has spaced-apart sidewalls at said region of substantial adjacency, and in which said fin is intermediate said sidewalls.

8. The invention as claimed in claim 7, in which sidewalls are generally parallel to each other, and said fin is generally parallel to said sidewalls.

9. The invention as claimed in claim 5, in which said frame has an inclined rear wall converging rearwardly toward said foot, and in which said fin depends from said rear wall.

10. The invention as claimed in claim 9, in which said fin has a bottom edge that is near said blank when said frame is in mounted condition on said blank.

11. The invention as claimed in claim 5, in which said line guide is combined with a fishing rod blank by being secured thereto by epoxy and wrapping.

* * * * *